United States Patent Office 3,254,099
Patented May 31, 1966

3,254,099
17α-SUBSTITUTED-17β-HYDROXY ANDROSTANE AND ANDROSTENE DERIVATIVES
Georges Jolles and Jean Robert, Sceaux, France, assignors to Rhone-Poulenc S.A., Paris, France, a corporation of France
No Drawing. Filed Mar. 1, 1963, Ser. No. 262,227
Claims priority, application France, Mar. 5, 1962, 890,005; Jan. 18, 1963, 921,872
4 Claims. (Cl. 260—397.4)

This invention relates to new steroid derivatives, to processes for their preparation, and to pharmaceutical compositions containing them.

The steroid derivatives of the present invention are the androstane and androstene derivatives of the general formula:

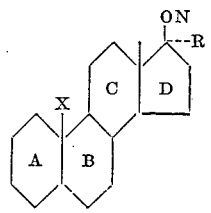

wherein R represents an alkyl group containing up to 4 carbon atoms, the vinyl or the ethynyl group, X represents an oxygen atom or the combination consisting of a hydroxy group in the β-configuration and a hydrogen atom in the α-configuration, and the nucleus B, when R is as hereinbefore defined, contains a double bond in the 5,6-position or, when R represents an alkyl group, is saturated.

According to a feature of the invention, the steroid derivatives of Formula I, in which X represents the combination consisting of a hydroxy group in the β-configuration and a hydrogen atom in the α-configuration, and R represents an alkyl group, are prepared by the process which comprises reacting 1β-acetoxy-17-oxo-androst-5-ene with an alkylmagnesium halide, the alkyl group of which contains up to 4 carbon atoms, hydrolysing in manner known per se the resultant organo-magnesium complex, and separating the 1β,17β-dihydroxy-17α-alkyl-androst-5-ene thus formed, and optionally hydrogenating that androstene derivative to the corresponding androstane derivative if a product is required in which there is no double bond in the nucleus B. Hydrogenation of the androstene compound may be effected by methods known per se, for example, by means of hydrogen in the presence of Adams' platinum.

1β-acetoxy-17-oxo-androst-5-ene employed as starting material in the aforementioned process may be obtained by a new method from 1β,3β-dihydroxy-17-oxo-androst-5-ene or a 1β,3β-dihydroxy-5,6-dehydro-steroid having on the nucleus D a group transformable into a 17-oxo function, for example, the spiroketal chain of ruscogenin or neoruscogenin. In this method, illustrated schematically below:

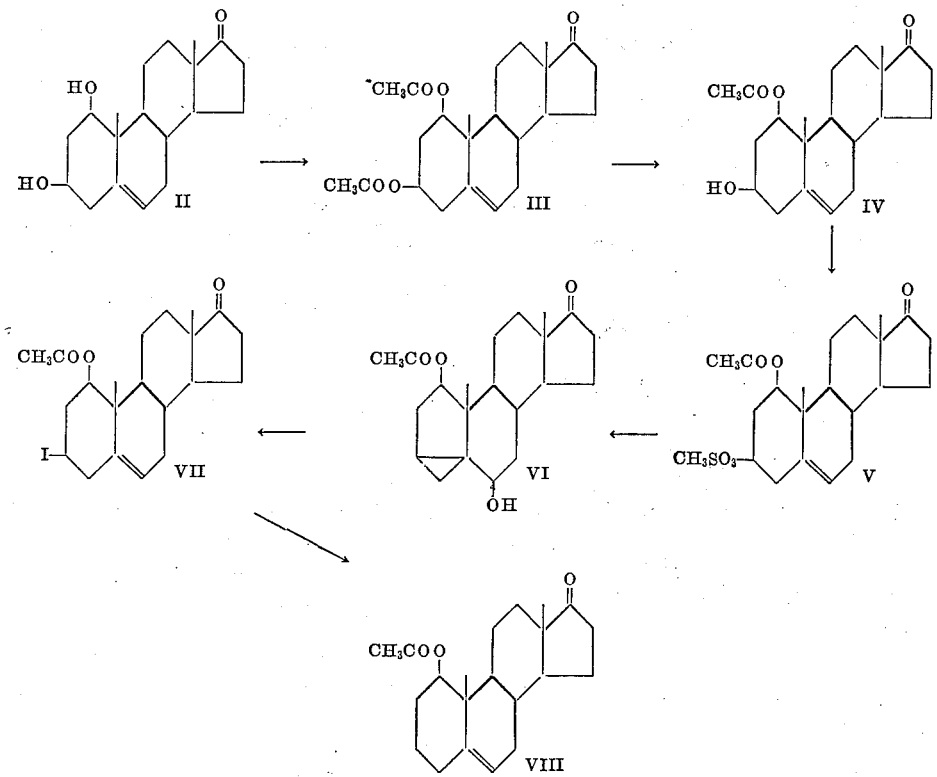

the starting material 1β,3β-dihydroxy-17-oxo-androst-5-ene (II) is converted in manner known per se into the corresponding diacetate (III), which by selective hydrolysis gives 1β - acetoxy-3β-hydroxy-17-oxo-androst-5-ene (IV). By the reaction of the last-mentioned compound with a derivative of methanesulphonic acid (preferably methanesulphonyl chloride), 1β-acetoxy-3β-methanesulphonyloxy-17-oxo-androst-5-ene (V) is obtained. That compound is converted into 1β-acetoxy-3,5-cyclo-6β-hydroxy-17-oxo-androstane (VI) by treatment with potassium acetate. Treatment of the compound of Formula VI with a hydrohalic acid, for example hydriodic acid, gives a 1β-acetoxy-3β-halo-17-oxo-androst-5-ene such as 1β - acetoxy-3β-iodo-17-oxo-androst-5-ene (VII) which, in the presence of a reducing agent such as Raney nickel, gives 1β-acetoxy-17-oxo-androst-5-ene (VIII).

From 1β-acetoxy-17-oxo-androst-5-ene the steroid derivatives of Formula I may be derived in accordance with the following reaction scheme:

ethynyl-steroids from corresponding 17-oxo-steroids. Preferably, 1β,17β - dihydroxy-17α-ethynyl-androst-5-ene is prepared by the reaction in an inert organic solvent, such as an ether (e.g. diethyl ether), of 1β-acetoxy-17-oxo-androst-5-ene with sodium or potassium acetylide prepared in situ.

According to a still further feature of the invention, 1β,17β-dihydroxy-17α-vinyl-androst-5-ene (XII) is prepared from the corresponding 17α-ethynyl compound (XI) by hydrogenation of the ethynyl group to the vinyl group by methods known per se for the conversion of an acetylenic derivative of an androst-5-ene to an ethylenic derivative without affecting the double bond in the 5,6-position of an androstene ring. The hydrogenation is preferably carried out in the presence of a palladium-based catalyst (e.g. palladium on charcoal or an alkaline earth carbonate) in pyridine as solvent.

1β,17β-dihydroxy-17α-ethyl-androst-5-ene (XV) may, in accordance with a further feature of the invention, be

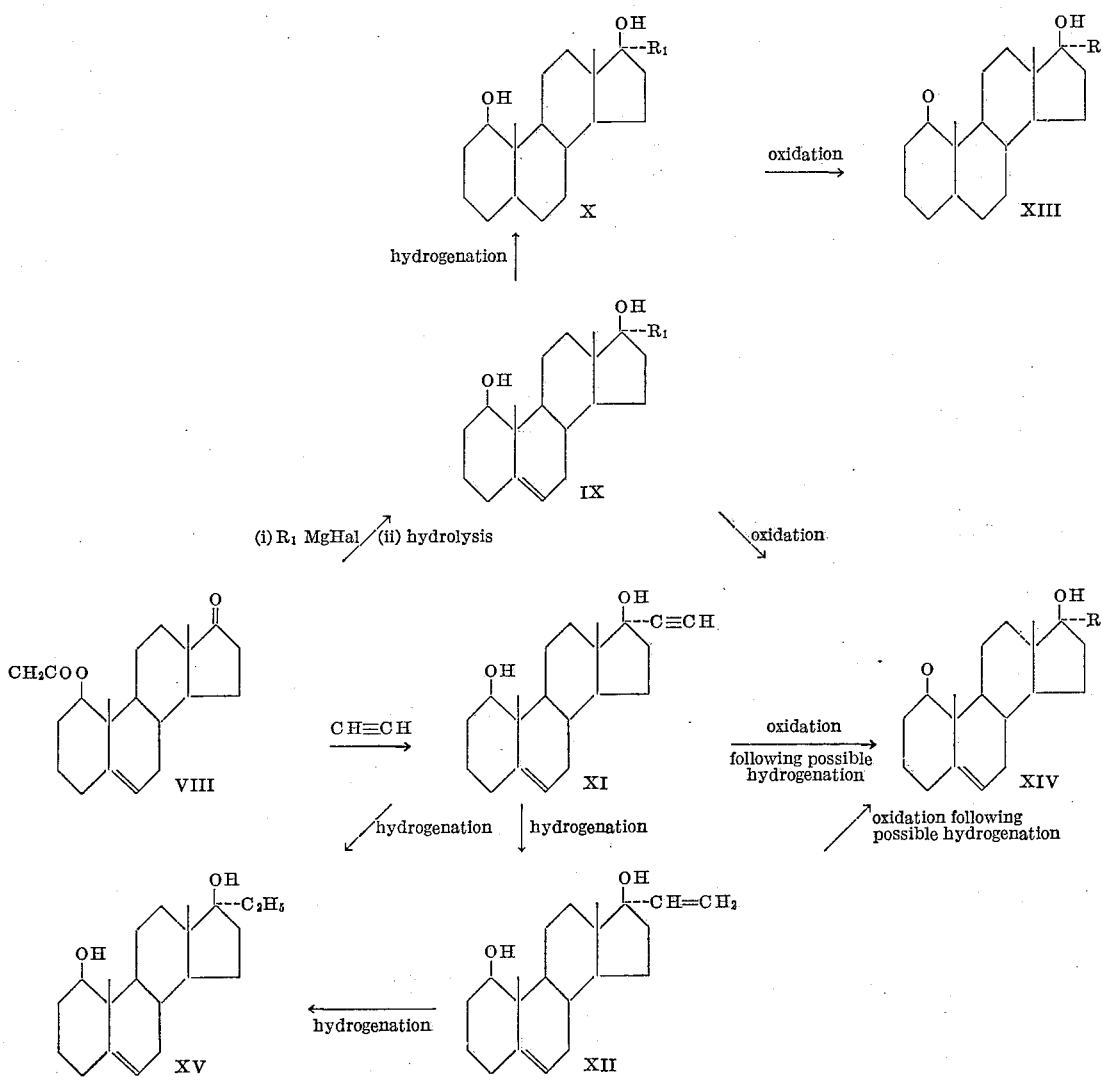

wherein $R_1$ represents an alkyl group containing up to 4 carbon atoms, Hal represents a halogen atom and R is as hereinbefore defined. The conversion of the compound of Formula VIII to a 1β,17β-dihydroxy-17α-alkyl-androst-5-ene (IX) and a compound of Formula IX to a 1β,17β-dihydroxy-17α-alkyl-androstane (X) is described in the process referred to above.

According to another feature of this invention, 1β,17β-dihydroxy-17α-ethynyl-androst-5-ene (XI) is prepared from 1β-acetoxy-17-oxo-androst-5-ene (XIII) by methods known per se for the preparation of 17β-hydroxy-17α- prepared by the hydrogenation of the 17α-ethynyl or -vinyl group of an androstene derivative of the formula:

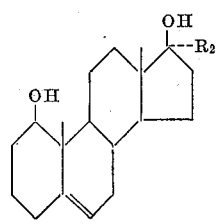

(wherein $R_2$ represents an ethynyl or vinyl group) to the ethyl group by methods known per se for carrying out such a reduction without affecting the double bond in the androstene ring. The hydrogenation is preferably carried out in the presence of Adams' platinum as catalyst and a mixture of acetic acid and ethyl acetate as solvent.

According to another feature of the invention, the steroid derivatives of Formula I in which X represents an oxygen atom are prepared by the oxidation by methods known per se of corresponding compounds in which X represents the combination consisting of a hydroxy group in the β-configuration and a hydrogen atom in the α-configuration. The oxidation may be carried out with reactants customarily used for oxidations of this type, in particular a sulpho-chromic reagent.

In this specification and accompanying claims the term "methods known per se" means methods heretofore used or described in the chemical literature.

The androstane and androstene derivatives of general Formula I have useful biological activities; in particular, they possess anabolic properties with the advantage of a weak androgenic activity. Preferred compounds of the invention are 1-oxo-17α-methyl-17β-hydroxy-androst-5-ene and 1-oxo-17α-methyl-17β-hydroxy-androstane.

The following examples illustrate the invention.

*Example I*

A Grignard reagent is prepared by the progressive addition of methyl iodide (54 g.) to a suspension of magnesium turnings (9.2 g.) in anhydrous diethyl ether (300 cc.). To this reagent is added, over 20 minutes, a solution of 1β-acetoxy-17-oxo-androst-5-ene (10 g.) in anhydrous diethyl ether (700 cc.). After stirring for 20 hours at ambient temperature followed by 4 hours under reflux, the reaction mixture is cooled and a 25% aqueous solution of ammonium chloride (700 cc.) added progressively. After stirring for 1 hour and decanting, the aqueous phase is extracted with diethyl ether (2 x 250 cc.) and the combined ethereal phases washed with water (2 x 250 cc.+100 cc.) until the washings are neutral. The combined washing waters are then washed with diethyl ether (250 cc.), which is then itself washed with water (100 c. and 50 cc.). The ethereal phases are combined, dried over sodium sulphate, filtered and the diethyl ether removed on a water-bath. White crystals remain which are dried overnight at 25°C./0.3 mm. Hg (dry weight: 9.8 g. of crude product). The crystals are taken up in benzene (50 cc.) and the solution obtained is chromatographed through a silica gel column (125 g.; interior diameter of column 2.4 cm.). The 1β,17β-dihydroxy-17α-methyl-androst-5-ene product is eluted with a 3:1 benzene-ethyl acetate mixture (1050 cc.). After drying at 60°C./0.3 mm. Hg, 1β,17β-dihydroxy-17α-methyl-androst-5-ene (6.2 g.), M.P. 134-136° C., is obtained.

1β-acetoxy-17-oxo-androst-5-ene employed as starting material is obtained as follows:

1β,3β-dihydroxy-17-oxo-androst-5-ene, 1β,3β-diacetoxy-17-oxo-androst-5-ene and 1β-acetoxy-3-hydroxy-17-oxo-androst-5-ene are prepared as described by W. R. Benn et. coll., J. Amer. Chem. Soc. 79, 3920 (1957). Then, the last-mentioned compound (20.5 g.) is dissolved in anhydrous pyridine (100 cc.), cooled to +2° C., and methanesulphonyl chloride (20 g.) added over 15 minutes with stirring, the temperature being kept at +2° C. After stirring for 1 hour in an ice-bath, the reaction mixture is kept overnight at laboratory temperature and protected from the light. It is then poured, with stirring, into ice-water (2000 cc.), stirred for 1 hour, filtered through sintered glass and washed very freely with water. After drying at 50° C./30 mm. Hg for 18 hours, there is obtained crude 1β-acetoxy-3β-methanesulphonyloxy - 17 - oxo-androst-5-ene (25 g.), which softens with decomposition at about 110° C., and can be used as it is in the following stage.

The crude product obtained (25 g.) is dissolved in methyl ethyl ketone (1400 cc.). A solution of potassium acetate (35 g.) in water (335 cc.) is prepared and the two solutions are mixed and heated under reflux for 18 hours. After cooling, solvent (1000 cc.) is removed at 45° C./30 mm. Hg and the remaining organic phase separated by decanting. The aqueous phase is then extracted with methyl ethyl ketone (3 x 350 cc.) and the various organic solutions obtained are mixed and washed with water (2 x 250 cc.). The washing waters are then in their turn washed with methyl ethyl ketone (100 cc.); the ketone washings are then themselves washed with water (50 cc.) and combined with the preceding organic solutions. After filtering with a filtration adjuvant and removal of the solvent at 45° C./30 mm. Hg, a yellowish oil remains which is crystallised by the addition of an equal volume of hexane. The crystals are filtered off on sintered glass, washed with hexane (25 cc.), separated and dried at 25° C./0.3 mm. Hg, giving 1β-acetoxy-3,5-cyclo-6β-hydroxy-17-oxo-androstane (19 g.), M.P. 152-157° C.

The last-mentioned compound (24 g.) is dissolved in acetic acid (300 cc.) and 57% pure hydriodic acid (d.=1.70; 48 cc.) added in a single portion. A yellow precipitate slowly forms. After stirring for 1 hour at laboratory temperature, the reaction mixture is poured into ice-water (4500 cc.) and stirred again for 1 hour. A yellow precipitate is obtained which is filtered off on sintered glass and then dried at laboratory temperature overnight in the air. The product obtained (31 g.) consists of slightly damp, crude 1β-acetoxy-3β-iodo-17-oxo-androst-5-ene, which may be used as it is in the following stage.

The crude 1β-acetoxy-3β-iodo - 17 - oxo-androst-5-ene (7.12 g.) is mixed with ethanol (250 cc.) and Raney nickel (30 g.), the mixture heated under reflux for 1 hour under nitrogen, with stirring, filtered hot, the nickel washed with ethanol and the solvent removed at 60° C./30 mm. Hg. A white crystalline mass remains which is dissolved in 15 volumes of hot hexane. Decolourising charcoal is added, the solution filtered hot and the filtrate cooled, giving a solid which is separated by filtration and dried (dry weight: 3.49 g.) and is 1β-acetoxy-17-oxo-androst-5-ene, M.P. 126-127° C.

*Example II*

1β,17β-dihydroxy-17α-methyl-androst-5-ene (1.29 g.) is dissolved in pure acetone (150 cc.), cooled to +5° C., a current of dry nitrogen passed through the solution, and an oxidizing agent (1.3 cc.), the preparation of which is described below, added. After stirring for 8 minutes at between +5° C. and +10° C. under nitrogen, the reaction mixture is poured into ice-water (600 cc.) and stirred for 1 hour, giving white crystals which are filtered off, washed with water until the washings are neutral, and dried at 60° C./0.3 mm. Hg. The crude product obtained is dissolved in 20 volumes of hot hexane, decolourizing charcoal added and the solution filtered hot. After leaving to crystallise, the crystals are filtered off and dried to constant weight at 80° C./0.3 mm. Hg, giving 1-oxo-17α-methyl-17β-hydroxy-androst-5-ene (1.085 g.), M.P. 118-120° C.

The oxidizing agent is prepared as follows: Chromium trioxide (26.72 g.) is dissolved in water (50 cc.) and sulphuric acid (d.=1.83; 23 cc.) added. When the solution has returned to laboratory temperature, the volume is made up to 100 cc. with water.

*Example III*

A solution of 1β,17β-dihydroxy-17α-methyl-androst-5-ene (4 g.) in glacial acetic acid (100 cc.) is hydrogenated at laboratory temperature and atmospheric pressure until an equimolecular quantity of hydrogen has been absorbed. Adams' platinum (1.25 g.), which has previously been hydrogenated to saturation in acetic acid, is used as catalyst. After filtration, the acetic acid is removed at 45° C./30 mm. Hg, leaving an oil which is then taken up in diethyl ether (50 cc.), washed with a 5% aqueous sodium bicarbonate solution followed by water, dried over sodium sulphate and filtered. The diethyl ether is removed on a water-bath, giving an oil (4.09 g.) which is chromatographed through a silica gel column (48 g.). The fractions eluted with benzene-ethyl acetate mixtures (9:1 followed by 8:2 by volume) are combined and recrystallized from hexane (75 cc.), giving 1β,17β-dihydroxy-17α-methyl-androstane (2.09 g.), M.P. 68–73° C. (softening).

*Example IV*

A current of dry nitrogen is passed into a solution of 1β,17β-dihydroxy-17α-methylandrostane (1.13 g.) in pure acetone (135 cc.) cooled to +3° C., and an oxidizing agent (prepared as described in Example II; 1.15 cc.) added. After stirring for 7 minutes, the reaction mixture is poured into ice-water (1 litre) and filtered to remove a precipitate which forms. The filtrate is extracted with diethyl ether (3 x 100 cc.), and the combined ethereal extracts are washed with a 5% aqueous sodium bicarbonate solution (50 cc.) followed by water (50 cc.), dried over sodium sulphate, filtered and the diethyl ether removed on a water-bath, leaving a white solid which is combined with the precipitate separated previously. A partially crystallized solid (1.04 g.) is thus obtained which is dissolved in diethyl ether (70 cc.), treated with decolourizing charcoal, filtered while hot, evaporated to dryness and taken up in diethyl ether (10 cc.). After being allowed to recrystallise for 40 hours in a refrigerator, 1-oxo-17α-methyl-17β-hydroxy-androstane (0.84 g.) is finally obtained, having two melting points:
1st melting point: 126–128° C.
2nd melting point: 140–142° C.

*Example V*

Potassium (7.66 g.), cut into pieces, is added over 20 minutes with agitation to a flask kept at about −70° C. and containing liquid ammonia (380 cc.). This mixture is then stirred for 2 hours at about −70° C. A current of acetylene is then passed in until the solution is decoloured and then, while the passage of acetylene is continued, a solution of 1β-acetoxy-17-oxo-androst-5-ene (4.974 g.) in anhydrous diethyl ether (330 cc.) is added over 25 minutes. Stirring and the passage of acetylene is continued for 90 minutes. The refrigerating bath is then removed and the ammonia allowed to evaporate overnight, with stirring. After purging with nitrogen and cooling in an ice-bath, ethanol (200 cc.) is added followed, in 1 hour, by water (270 cc.). The solution obtained is acidified to pH 1 with 6 N sulphuric acid (60 cc.), water (500 cc.) added and then the whole extracted with diethyl ether (3 x 200 cc.). The ethereal extracts are washed with water and the aqueous washing solutions are then extracted with diethyl ether. The combined ethereal extracts are washed with water, dried over sodium sulphate and filtered. After evaporating the diethyl ether, a solid orange residue (5 g.) is obtained, which is a mixture of 1β-acetoxy-17β-hydroxy-17α-ethynyl-androst-5-ene and 1β,17β-dihydroxy-17α-ethynyl-androst-5-ene.

This crude product is converted into 1β,17β-dihydroxy-17α-ethynyl-androst-5-ene by treatment with lithium aluminium hydride in the following manner:

Lithium aluminium hydride (1.17 g.) is suspended in anhydrous diethyl ether (70 cc.) at −10° C. under nitrogen. A solution of the crude product obtained above in anhydrous diethyl ether (180 cc.) is then added over 10 minutes. After heating for 15 minutes under reflux, the reaction mixture is stirred overnight at ambient temperature under nitrogen. The excess lithium aluminium hydride is destroyed with a mixture of ethyl acetate, sodium hydroxide and water. After filtering and washing with acetone (200 cc.), the filtrate and combined washing solution are concentrated at 30 mm. Hg to remove all the organic solvents. The suspension obtained is taken up in water (200 cc.) and filtered over sintered glass. The solid obtained is washed with water and then dried to constant weight at 0.3 mm. Hg, giving 1β,17β-dihydroxy-17α-ethynyl-androst-5-ene (4.35 g.), M.P. 147–149° C.

*Example VI*

A solution of 1β,17β-dihydroxy-17α-ethynyl-androst-5-ene (3 g.) in a 1:1 mixture of acetic acid and ethyl acetate is hydrogenated at atmospheric pressure and ambient temperature (about 20° C.) in the presence of Adams' platinum (0.6 g.) until twice the equimolecular quantity of hydrogen has been absorbed. The reaction mixture is then filtered, the solvents removed at 45° C./30 mm. Hg, and the residue taken up in water (50 cc.). The white solid obtained is filtered off, washed with water and dried to constant weight at 0.3 mm. Hg. Crude 1β,17β-dihydroxy-17α-ethyl-androst-5-ene (2.833 g.) is obtained.

*Example VII*

A current of dry nitrogen is passed into a solution of the crude 1β,17β-dihydroxy-17α-ethyl-androst-5-ene (2.73 g.), obtained in the last example, in acetone (325 cc.) cooled to +4° C. An oxidizing agent (2.7 cc.) [prepared by dissolving chromic oxide (26.72 g.) in water (50 cc.) to which has been added sulphuric acid (d.=1.83; 23 cc.) and then, when the solution has returned to laboratory temperature, adding water (to 100 cc.)] is then added. The reaction mixture is stirred for 8 minutes at between +5° C. and +10° C. under nitrogen and then poured into ice-water (4 litres). After stirring for 30 minutes, white crystals are obtained which are filtered off and washed with water until the washings are neutral. These crystals are dissolved in a hot 1:1 solution of isopropanol in water (150 cc.), and the solution allowed to crystallise overnight in a refrigerator, filtered and the crystals obtained dried to constant weight at 80° C./0.3 mm. Hg, giving 1-oxo-17α-ethyl-17β-hydroxy-androst-5-ene (1.44 g.), M.P. 172–173° C.

*Example VIII*

A solution of 1β,17β-dihydroxy-17α-ethyl-androst-5-ene (4.86 g.) (prepared as described in Example VI) in glacial acetic acid (400 cc.) is hydrogenated at atmospheric pressure and ambient temperature in the presence of Adams' platinum (1 g.) previously saturated with hydrogen, until an equimolecular quantity of hydrogen has been absorbed. The reaction mixture is filtered and the solvent removed at 45° C./30 mm. Hg, giving an oil which is taken up in diethyl ether (100 cc.). The ethereal solution is washed with water until the washings are neutral, dried over sodium sulphate, filtered and evaporated to dryness on a water-bath. After drying the residue under increasing vacuum, 1β,17β-dihydroxy-17α-ethyl-androstane (4.82 g.) is obtained as an amorphous powder.

*Example IX*

A current of dry nitrogen is passed into a solution of 1β,17β-dihydroxy-17α-ethyl-androstane (4.82 g.) in acetone (570 cc.) cooled to +4° C. An oxidising agent 4.82 cc.) (prepared as described in Example II) is then added and the reaction mixture stirred for 8 minutes at between +5° C. and +10° C. and then poured into ice water (5.7 litres). After stirring for 15 minutes, the white crystals obtained are filtered off and washed until the washings are neutral. The crystals are then dissolved in hot isopropanol (25 cc.), treated with decolourizing charcoal and filtered hot. Hot water (15 cc.) is then added to the filtrate and the solution allowed to crystallize overnight in a refrigerator. The crystals obtained are filtered off and dried to constant weight at 80° C./0.3 mm. Hg, giving 1-oxo-17α-ethyl-17β-hydroxy-androstane (1.25 g.), M.P. 189–190 C.

Example X

A current of dry nitrogen is passed into a solution of 1β,17β-dihydroxy-17α-ethynyl-androst-5-ene (2.2 g.) in acetone (385 cc.) cooled to +4° C., and an oxidizing agent (3.3 cc.) (prepared as described in Example II) is added. The reaction mixture is stirred for 8 minutes at between +4° C. and +8° C. under nitrogen and then poured into ice-water (3 litres). The solid product formed is filtered off and dissolved in diethyl ether (100 cc.). The filtrate is extracted with diethyl ether (4 x 200 cc.) and the ethereal extracts then washed with a 5% aqueous sodium bicarbonate solution (200 cc.) followed by water (2 x 200 cc.). The aqueous washing solutions are extracted with diethyl ether (200 cc.) and the ethereal solution obtained is washed with water (50 cc.). All the ethereal solutions are combined, dried over sodium sulphate and filtered. After evaporation of the diethyl ether on a water-bath, an oil (1.8 g.) is obtained which is chromatographed on silica gel (36 g.). 1-oxo-17α-ethynyl-17β-hydroxy-androst-5-ene is eluted with benzene containing 10% ethyl acetate. After evaporation of the solvents, a crystalline product (1.36 g.) is obtained which is taken up in a hot mixture of hexane (70 cc.) and ethyl acetate (2 cc.). Decolourizing charcoal is added, the solution filtered hot, concentrated to 40 cc., and allowed to crystallize for 48 hours in a refrigerator. The solid obtained is filtered off and dried to constant weight at 60° C./0.3 mm. Hg, giving 1-oxo-17α-ethynyl-17β-hydroxy-androst-5-ene (0.68 g.), M.P. 156–158° C.

Example XI

A suspension of palladium on charcoal (3.15% metal; 1.845 g.) in pyridine (40 cc.) is saturated with hydrogen at atmospheric pressure. A solution of 1β,17β-dihydroxy-17α-ethynyl-androst-5-ene (1.845 g.) in pyridine (20 cc.) is then added and the ethynyl compound hydrogenated at ambient temperature and atmospheric pressure for 80 minutes; 125 cc. of hydrogen is absorbed. The reaction mixture is filtered and the pyridine removed at 30 mm. Hg. The residue is taken up in diethyl ether (100 cc.) and the ethereal extract washed with normal hydrochloric acid (2 x 50 cc.) followed by water (50 cc.). The aqueous washing solutions are extracted with diethyl ether (50 cc.) and the ethereal solution then washed with water (20 cc.). The combined organic phases are dried over sodium sulphate, filtered and evaporated to dryness on a water-bath. The residue obtained is dried to constant weight at 25° C./0.3 mm. Hg, giving 1β,17β-dihydroxy-17α-vinyl-androst-5-ene (1.82 g.), M.P. 131–133° C.

Example XII

A current of dry nitrogen is passed into a solution of 1β,17β-dihydroxy-17α-vinyl-androst-5-ene (1.96 g.) in acetone (235 cc.) cooled to +4° C., and an oxidizing agent (2.95 cc.) (prepared as described in Example II) is then added. The reaction mixture is stirred for 8 minutes at between +5° C. and +10 C. under nitrogen and poured into ice-water (2 litres). The partially crystalline product which precipitates is extracted with diethyl ether (3 x 500 cc.). The ethereal extracts are washed with a 5% aqueous solution of sodium bicarbonate followed by water. The aqueous washing solutions are extracted with diethyl ether, the ethereal extracts combined, dried over sodium sulphate, filtered and evaporated to dryness on a water-bath. A crude amorphous product (1.515 g.) is obtained which is chromatographed on silica gel (30.3 g.). The fractions eluted with benzene-ethyl acetate mixtures (successive mixtures of 96:4, 94:6, and 90:10) are combined and evaporated to dryness, giving an oil (1.392 g.) which is taken up in ethyl acetate (50 cc.). The ethyl acetate phase is decanted, warmed gently, treated with decolourizing charcoal, filtered and then concentrated (to 4 cc.). After leaving to crystallize in a refrigerator, 1-oxo-17α-vinyl-17β-hydroxy-androst-5-ene (0.3 g.), M.P. 136–138° C., is obtained after filtration and drying to constant weight.

The present invention further includes within its scope pharmaceutical compositions which comprise one or more compounds of general Formula I together with a pharmaceutical carrier or coating. In clinical practice the compounds of the present invention will normally be administered orally, in consequence of which the preferred compositions are those of the kind suitable for oral administration.

Solid compositions for oral administraiton include compressed tablets (including enteric coated tablets), pills, dispersible powders, and granules. In such solid compositions one or more of the active compounds is, or are, admixed with at least one inert diluent such as calcium carbonate, potato starch, alginic acid, sucrose or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups, and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

The percentage of active ingredient in the compositions of the invention may be varied, it being necessary that it should constitute a proportion such that a suitable dosage shall be obtained for the anabolic effect desired which may be used in the treatment of disturbances in protein metabolism: e.g. during convalescence, surgical operations, burns, thinness and cachexia. For oral administration the preparations should normally be such as to give conveniently 50 to 100 mg. of active substance per day over a period of 20 to 30 days.

The following example illustrates pharmaceutical compositions according to the invention.

Example XIII

Tablets are prepared in the usual manner having the following composition:

|  | G. |
| --- | --- |
| 1-oxo-17α - methyl-17β-hydroxy-androst-5-ene | 0.005 |
| Starch | 0.112 |
| Silica gel | 0.030 |
| Magnesium stearate | 0.003 |

We claim:
1. A compound of the formula:

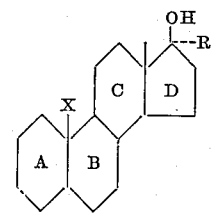

wherein X represents a member of the class consisting of an oxygen atom, and the combination consisting of a hydroxy group in the β-configuration and a hydrogen atom in the α-configuration, and when the ring B of the steroid nucleus contains a double bond in the 5,6-position, R represents a member of the class consisting of alkyl of up to 4 carbon atoms, and vinyl and ethynyl groups, and when the ring B of the steroid nucleus is saturated, R represents an alkyl group.

2. A compound of the formula:

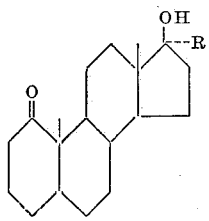

wherein R is lower alkyl.
3. 1-oxo-17α-methyl-17β-hydroxy-androst-5-ene.
4. 1-oxo-17α-methyl-17β-hydroxy-androstane.

References Cited by the Examiner

UNITED STATES PATENTS 3,080,360  3/1963  Pappo _____ 260—239.55
3,080,399  3/1963  Ringold et al. _____ 260—397.5

OTHER REFERENCES

Djerassi: Steroid Reactions, pages 111 and 154 relied on (1963), Holden-Day Inc., San Francisco, Calif.

Loewenthal: Tetrahedron, vol. 6, pp. 269–303 (1959), pages 269–275 and 295–299 relied on.

LEWIS GOTTS, *Primary Examiner*.

HENRY A. FRENCH, *Assistant Examiner*.